Patented Oct. 11, 1932

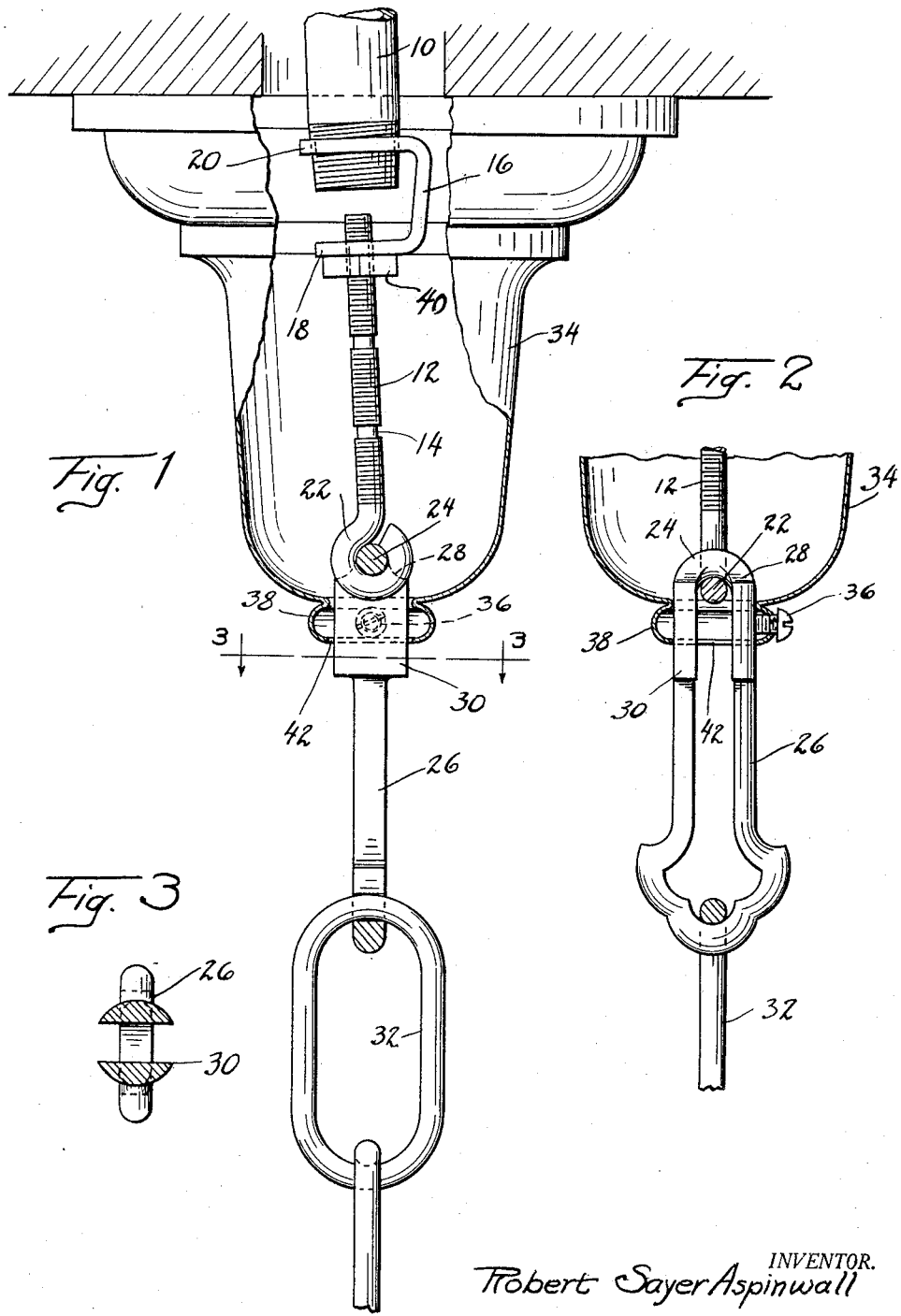

1,882,312

UNITED STATES PATENT OFFICE

ROBERT SAYER ASPINWALL, OF DETROIT, MICHIGAN

CANOPY STEM

Application filed March 29, 1930. Serial No. 439,930.

My invention relates to canopy stems to be utilized in supporting chandeliers from insertions which are provided in ceilings for that purpose.

One object of my invention is to provide a canopy stem formed in a plurality of sections, two being here shown. One section is secured to the ceiling insert and the other section supports the lighting fixture such as a chandelier. The upper section, which is attached to the ceiling insert, is entirely enclosed within the canopy, and the lower section is connected thereto within the canopy but depends therebelow. The lower section is universally coupled to the upper within the canopy whereby, though the upper section may depend from the ceiling insert at an angle to the vertical, the lower one may always be readily adjusted to hang plumb with respect to the ceiling, and that portion thereof which is exposed below the canopy will always be so arranged.

A meritorious feature of my invention, closely allied with that specified, is to provide a universal coupling that will offer limited resistance to adjustable movement. In this way, once adjusted to assume the desired perpendicular or plumb line from the ceiling, the hanger member which supports the chandelier structure will remain in that position.

Another object is to render this improved canopy stem adaptable for use with canopies of varying lengths. For this purpose I have so designed that portion of the stem which is secured to the ceiling insert, that it may readily be shortened without the use of special instruments to any one of a number of predetermined lengths. The means which I provide for so doing interferes in no way with the means provided for securing the stem to the ceiling.

Aside from means for easily shortening its length the canopy stem is provided with means which cooperate with the member which couples it to the ceiling insert for the purpose of adjusting the depth to which the stem drops from said ceiling within a predetermined range. By virtue of this adjusting means the canopy stem may be utilized with canopies of varying lengths, the extremes of which lengths fall within the range of such adjustment. Should the canopy be of a size which would not fit the standard length of the canopy stem, the stem itself may be shortened as heretofore specified.

It is a particular object of my invention to provide the improvements above outlined while at the same time using a very simple structure, inexpensive to manufacture, and embodying parts which may be readily replaced.

Further objects and meritorious features of my invention will appear from the accompanying description taken in conjunction with the drawing wherein:

Fig. 1 is a side elevation, partly broken away for the sake of clearness,

Fig. 2 is an elevation partly in section, taken at an angle of 90°, to Fig. 1, and Fig. 3 is a section taken on the line 3—3 of Fig. 1.

During the construction of dwellings it is customary to provide in the ceilings thereof an insert member 10 which is anchored within the ceiling and extends therebelow a short distance. This insert is designed to support various types of chandeliers by the use of different types of canopy stem assemblies.

My canopy assembly includes a stem 12, which is exteriorly threaded and which is provided at spaced apart intervals along its length with annular grooves 14 for a purpose hereinafter to be described. A U-shaped bracket 16 has one arm 18 interiorly threaded to receive the stem 12 and the other arm 20 likewise threaded to fit the exteriorly threaded outer extremity of the ceiling insert 10.

The lower extremity of 12 constitutes an eye 22 through which the upper extremity 24 of hanger member 26 extends. This upper portion 24 is cut away as indicated at 28, to an extent sufficient to permit it to pass through eye portion 22, and flares outwardly just below the connecting portion, and on each side thereof, to provide segments 30.

Any desired type of chandelier hanging may be supported by the hanger member 26. In the drawing a series of links 32 indicate the well known chandelier supporting chain.

The canopy member 34 is pressed up against the ceiling and secured in that position by means of a set screw 36 located at the lower extremity, or flared out portion 38, of the canopy. The set screw bears against the segmental portion 30 of the hanger member, and it is to be noted that the depth of this segmental portion is sufficient to permit utilization of various sized canopies within a given range.

The purpose of the annular grooves 14 in the fastener member 12 is to permit readily shortening its length by breaking or cutting at the grooved portions, and each of the threaded portions of member 12 separated by these recesses 14 is substantially equal in length to the depth of segmental portion 30. In this way the canopy stem assembly may be adjusted, within a certain range, to varying lengths of drop by screwing up the stem 12 in arm 18 of the supporting bracket. At the same time there will always be a portion of the segment 30 to cooperate with the set screw 36 in securing the canopy in place against the ceiling.

In assembling the structure the stem 12, without the bracket 16 and its accompanying lock nut 40, may be inserted through the aperture 42 at the bottom of canopy 34. The bracket 16 is then screwed on to the stem 12 and arm 20 of said bracket is screwed on to the ceiling insert 10. The canopy is then forced up flush with the ceiling and the set screw 36 screwed up to secure the same in place. If the insert member 10 is not disposed normal to the ceiling surface, as here shown, the bracket 16 and stem member 12 will continue and increase this angular projection, but the hanger portion 26 of the stem may be readily angularly adjusted with respect to the portion 12 so that it will hang plumb, as shown in the drawing.

It will be noted that in Fig. 1 the hanger member 26 is free to swing through a wide arc in the plane of the paper, but the contact between the eye 22 and extremity 24 of the hanger member is sufficiently close to provide a limited resistance to relative movement of these two parts. The frictional contact between these elements 12 and 26 is, however, sufficiently snug at the joint so that there is a tendency for the hanger member 26 to remain in fixed relation to the stem member 12 after a definite relationship between the two is established.

A similar adjustment may be made in the plane of the paper as the assembly is illustrated in Fig. 2, although the adjustment in this direction is more limited by reason of the shape of segmental portions 30, which latter shape is clearly illustrated in Fig. 3.

Various modifications will be apparent to those skilled in the art and for that reason I intend to limit myself in the scope of the appended claims.

What I claim is:

1. In combination with a fixed threaded ceiling insert member, a fixture supporting assembly comprising two sections, one section adjustably threadedly connected to the insert to depend therebelow in line therewith, the other section connected to the lower end of the first section by a joint permitting relative angular adjustment of said other section with respect to the first section, said second section having a canopy supporting portion adjacent its upper end, a canopy secured to said portion and adjustable lengthwise thereover, said first section divided by spaced weakened parts into a plurality of nub sections of a length approximately equal to that of the canopy supporting portion of the second section.

2. A canopy and stem assembly comprising a ceiling insert and a fastener member secured thereto, a hanger member coupled to said fastener member for universal adjustment as an extension thereof, means for adjusting the drop of such assembly in relation to the ceiling insert, said hanger member having a canopy supporting portion adapted to co-operate with a set screw for retaining a canopy in place thereon, a canopy adjustable lengthwise over said portion, said fastener member being divided by weakening lines into sections of a length approximating the canopy supporting portion of the hanger member.

3. A canopy stem including a threaded stem having annular grooves spaced apart throughout the length, and a hanger member coupled therewith for universal adjustment in relation thereto, a limited frictional resistance to such adjusting movement being inherent in the coupling, said hanger member including a canopy supporting portion of a length approximating the distance between said annular grooves.

4. In a chandelier support, a stem having an eyelet at one extremity, and a hanger member having a loop portion extending therethrough and frictionally engaging the same, said loop portion including opposed segmental portions extending along a portion of the length of said hanger.

5. A canopy and stem assembly of the character described comprising, in combination, a ceiling canopy, a threaded stem assembly extending axially through an aperture in said canopy and adapted at its upper end within said canopy to be detachably connected with the ceiling support and provided with a canopy supporting portion along that part of its length which extends through the aperture in the canopy, means for securing the canopy at adjusted positions along the length of said canopy supporting portion of the stem assembly, said stem assembly provided within said canopy with a threaded portion having a section of a length not greater than the length of the canopy supporting portion and connected with the remainder of the stem along a weakened line for ready separation therefrom.

In testimony whereof, I sign this specification.

ROBERT SAYER ASPINWALL.